United States Patent
Mumme

(10) Patent No.: US 8,512,621 B2
(45) Date of Patent: Aug. 20, 2013

(54) GLOSS LEVEL ADJUSTMENT

(75) Inventor: Frank Mumme, Waldalgesheim (DE)

(73) Assignee: OC Oerlikon Balzers AG, Balzers, Furstentum (LI)

( * ) Notice: Subject to any disclaimer, the term of this patent is extended or adjusted under 35 U.S.C. 154(b) by 1881 days.

(21) Appl. No.: 11/013,164

(22) Filed: Dec. 15, 2004

(65) Prior Publication Data

US 2005/0133962 A1    Jun. 23, 2005

(30) Foreign Application Priority Data

Dec. 17, 2003  (DE) .................................. 103 59 321

(51) Int. Cl.
    *B29C 45/00*      (2006.01)
(52) U.S. Cl.
    USPC .............................. 264/334; 264/338; 425/547
(58) Field of Classification Search
    USPC ............ 264/328.16, 334, 337, 338; 425/547; 249/111, 134, 135
    See application file for complete search history.

(56) References Cited

U.S. PATENT DOCUMENTS

| | | | | |
|---|---|---|---|---|
| 5,362,226 A | * | 11/1994 | Kataoka et al. | ............... 425/526 |
| 5,458,818 A | | 10/1995 | Kim et al. | |
| 5,728,328 A | * | 3/1998 | Senda et al. | ................... 264/338 |
| 6,077,472 A | * | 6/2000 | Kataoka et al. | ............... 264/338 |
| 6,749,787 B2 | | 6/2004 | Mastro et al. | |
| 2002/0153636 A1 | | 10/2002 | Mastro et al. | |
| 2003/0006514 A1 | * | 1/2003 | Kosuge et al. | ................. 264/1.1 |
| 2003/0047823 A1 | * | 3/2003 | Ohman et al. | ................. 264/2.5 |
| 2005/0003239 A1 | * | 1/2005 | Derflinger et al. | ............ 428/698 |

FOREIGN PATENT DOCUMENTS

| JP | 8-197549 | * | 8/1996 |
|---|---|---|---|
| JP | 08336843 | | 12/1996 |
| JP | 09239739 | | 9/1997 |
| JP | 2003136564 | | 5/2003 |

* cited by examiner

*Primary Examiner* — Jill Heitbrink
(74) *Attorney, Agent, or Firm* — Price Heneveld LLP

(57) ABSTRACT

In a method for injection molding molten materials, especially plastic, in a mold that has a mold surface which comes into contact with the material, at least one coating on the mold surface and a temperature-control means for the mold surface, the mold surface is cooled by the temperature-control means so that the molten material solidifies at the interface with the coating and an injection-molded part can be removed from the form. During this process the molten material is brought into contact with the coating on the mold surface, the thickness of said coating being selected in coordination with the heat penetration coefficient of the coating material such that a specified 60° gloss level and/or color value L is obtained for the injection-molded part.

2 Claims, 3 Drawing Sheets

GLOSS LEVEL ADJUSTMENT

CROSS-REFERENCE TO RELATED APPLICATION

This application claims priority to German Patent Application No. 103 59 321.7 filed in Germany on Dec. 17, 2003, entitled GLOSS LEVEL ADJUSTMENT.

FIELD OF THE INVENTION

This invention relates to a method and a device for injection molding molten materials. Additional subject matter of the invention includes a useful coating configuration for injection molding devices that permits adjustment of the surface gloss of the injection-molded part being produced.

BACKGROUND OF THE INVENTION

During the production of injection-molded parts, especially injection-molded parts made of plastics, there is often a conflict in aims between the surface properties of the plastic, and hence its appearance, and the other properties, which influence the technical applications of the injection-molded part. A familiar example here is plastic polypropylene (PP). The surface finish of injection-molded parts made of PP is optically very advantageous if, as is often the case, a matte, non-reflecting surface is required. However, the scratch resistance of polypropylene is limited, which naturally reduces the application potential. For many applications, moreover, it is important to use plastics with higher scratch resistance. A typical example here is plastic acrylonitrile butadiene styrene (ABS), which for its part, however, has unfavourable surface properties in so far as the accuracy of surface-detail reproduction during the molding of injection-molded parts is concerned. If, using the plastic ABS, one wishes to obtain a surface impression that is matte and not highly glossy, or a surface without a large number of glossy spots, it is necessary to create a degree of roughness at the surface of the plastic so that incident light is scattered diffusely and not reflected as if by a mirror.

The production parameters that determine the surface finish of an injection-molded part are pressure, temperature of the injected material, and the time taken for a surface layer of the material to solidify. The material can, in principle, be any material that has the property of melting, or at least of converting to a flowable state, on heating, and of solidifying again—without the material being destroyed—on subsequent cooling. Many materials have this property, including thermoplastics, glass, elastomers and, to a certain extent, thermoset plastics if these are formed—for example by molecular cross-linking—when they are heated and then cooled again during the molding process.

The injection-molding process comprises the steps of introducing the molten material under pressure into a temperature-controlled or cooled molding tool and cooling the material until it has solidified sufficiently to permit removal of the injection-molded part. The main controllable variables available for influencing the surface finish of the injection-molded part are thus the pressure, the temperature of the molten material when it is injected into the mold, and the molding-tool temperature, which is controlled by way of active cooling. Of these parameters, the pressure can only be controlled within narrow limits, since a minimum pressure is necessary to ensure that the mold is filled completely and that the molding process does not take too long. The maximum pressure is limited by the maximum force that may be exerted on the mold. The temperature of the material when in the molten state is predetermined by the properties of the material. In the case of material blends, an insufficiently high temperature may result in separations, inadequate flow and too great a viscosity. Very high temperatures may destroy the material itself.

According to the prior art, it has hitherto been possible to work the surfaces of a mold such that they exhibit a degree of roughness that would suffice, for example, to scatter light diffusely in the manner described above. This effect can be obtained, for example, with spark-eroded or photo-etched surfaces. However, in the endeavor to transfer this very fine surface texture to the injection-molded part, differences in gloss level result because the fine texture is not reproduced uniformly in all areas and high-gloss spots are formed. The main reason for this is premature "freezing" of the molding material before it has penetrated into the fine surface texture of the mold. Such differences in gloss may also be only of localized occurrence if non-uniform cooling means that reproduction of the surface details is only prevented in certain areas, or that the injection-molded part shrinks more quickly in certain areas.

Gloss, hue and lightness are important factors for determining optical properties, in particular of articles made of plastics. Gloss is usually subdivided into the following categories: high-gloss, glossy, semi-gloss/silky, semi-matte/satin-matte, matte and dull matte. The individual categories are measured using a gloss meter and selecting different measuring angles. According to the German standard DIN 55 945 (Terms and definitions for coating materials), gloss is a sensation that is caused by the reflection of light beams at the surface of a coating and is perceived by the human eye. In the case of a smooth, matte surface, the incident light is scattered and reflected uniformly in all directions. By contrast, a smooth, high-gloss surface reflects the visible light in one direction, without any scatter, such that the angles of incidence and reflection are always the same. To make gloss measurements that compare well with the visual impression conveyed at different gloss levels, it is necessary, when using a gloss meter, to vary the angle of incidence of the visible light. In the transition range between glossy and matte, the measurement is performed at 60°. As was explained above, however, there are many applications in which matte surfaces are preferred, especially in the case of injection-molded plastics products.

In practice, the color value L is usually measured using the L*, A*, a*, b* system developed by Judd and Hunter and standardized in 1976 (DIN 6174, CIE LAB 1976). The L*-value represents the luminance, that is to say the lightness (0 to 100), and the two color channels a* and b* represent the values from green to red and blue to yellow respectively (from −127 to 128 in each case).

As explained, the surface-relevant factors gloss level and color value L*, which are important in particular for articles made of plastics, can be measured with appropriate equipment. The values obtained are free of subjective sensations of the human eye and can therefore be compared with each other on an objective basis.

Relatively expensive and time-consuming secondary finishing—for example a paint finish for certain plastic articles—is consequently necessary if, on account of other requirements, plastics have to be used that are apt to behave in the manner described above. A uniform, matte surface could be obtained, however, if the surface of the plastic were an exact reproduction, including the finest details, of the surface of the mold.

The method of obtaining a more accurate reproduction of the mold surface by selecting a higher mold temperature has the disadvantage that it necessitates a longer cooling time, hence prolonging the molding-cycle time. In addition, sink-mark formation is more pronounced because the plastic's ability to relax is increased.

It is also prior art to provide the surfaces of injection molds for plastics with thin coatings of hard metals, especially metal nitride or metal carbide compounds. The plastic's adhesive properties and hence the amount of force needed for removing the plastic from the injection mold are thereby reduced. On account of their excellent resistance to mechanical abrasion, these coatings also serve to reduce wear on the mold surface. It is desirable, however, that these coatings be applied as thinly as possible so as not to impair the dimensional accuracy of the injection mold, or to avoid having to make allowance early on, during production of the injection mold, for later dimensional changes caused by the coating.

SUMMARY OF THE INVENTION

An aspect of this invention is to provide an injection molding method and an injection molding device that make it possible to exactly transfer a finely textured surface, in particular a surface with a given degree of roughness, to the injection-molded part to be produced, and thereby to influence the surface properties of the injection-molded part.

Surprisingly, it was found that by appropriately coordinating the coating thickness with the heat penetration coefficient of the coating material, a desired gloss level and/or color value can be obtained, especially for plastic injection-molded products, and thus also an appropriate accuracy of surface-detail reproduction; according to the invention, a specified 60° gloss level and/or color value L* is obtained by coordinating the coating thickness and the heat penetration coefficient of the coating material.

The invention makes it possible to prevent gloss differences that are otherwise difficult, if not impossible, to remedy. Thanks to the inventive measures, the "freeze" effect of the molten plastic is delayed, as a result of which the accuracy with which the surface details of the mold are transferred to the plastic is optimized. When the molten plastic is injected into the molding tool, the wall thereof hardly changes in temperature. However, it is normal for the peripheral layers of the molten plastic to be abruptly and spontaneously cooled by more than 100 K. In consequence, the molten plastic "freezes" or solidifies abruptly at the mold's internal surface, so that in principle the inflowing molten plastic is not able to mold uniformly to the mold wall, or to the structural details thereof. By way of the measures provided for in the invention, the contact temperature, for one thing, is increased, so that freezing of the peripheral layers of plastic at the molding-tool wall is delayed. As a result, the molten plastic is able to mold accurately to the wall, and the finished product is a highly accurate reproduction. The surface of the plastic part thus has largely the same degree of roughness or surface detail as the mold wall, which means that the matte effect can be maximised. The consequences thereof are excellent gloss-level characteristics and color values L*.

The very surprising consequence of the invention is that because a somewhat thicker coating comprising a material with a low heat penetration coefficient is now used instead of the very thin coatings used hitherto, the surface details of the mold are reproduced more accurately. The penetration depth can be derived as thermal diffusion length from the heat penetration coefficient, which is determined by periodic introduction of a defined heat quantity (=heat pulse) with a modulation frequency f into the surface of a test specimen and measurement of the modulated temperature. The better the insulating properties of a (coating) material are, the lower is the material's heat penetration coefficient. This, however, is important as far as the average penetration depth is concerned, since the mold is alternately heated and cooled (by the cooling system) every time that fresh, molten material is introduced. If an optimized coating thickness is selected, which is greater than the thickness of coatings used in known applications, the surface temperature can be increased and approximated more closely to the temperature of the molten material. As a result, the outermost layer of the molding materal—the pressure and temperature of which remains unchanged at the time of injection-molding the part—does not solidify immediately on making contact with the coating surface and can penetrate deeper into the surface details of the mold, thus producing a better reproduction of its roughness.

The coating can advantageously comprise titanium nitride (TiN), titanium carbon nitride (TiCN), chromium nitride (CrN), tungsten carbide/carbon (WC/C) or titanium aluminium nitride (TiAlN). The coating can also be built up from several thin, alternating layers of these materials superposed one upon the other, or of combinations thereof, and thereby the entire heat transport into the mold material and to the mold-cooling means adjusted such as to obtain the desired favorable temperature of the uppermost coating. It is also theoretically possible to use layers that provide good thermal insulation, such as Al2O3, (AlCr)2O3 and SiO2, provided they have good release properties.

The other properties, too, of the materials mentioned above can be used to advantage, for example enhanced wear resistance and improvement of the release properties such that removing the molded part is facilitated.

If, for example, one wishes to produce injection-molded parts made of ABS that have a gloss level and a color value identical to those of injection-molded parts made of PP, it suffices to coat a PP mold, or any other mold that is identical at least in respect of the surface microstructure, with a coating of coating-specific thickness, provided this coating has a markedly lower heat penetration coefficient than that of the mold material.

When the material titanium aluminium nitride (TiAlN), in particular, is used, a coating thickness between 7 μm and 11 μm and especially a coating thickness of 8 μm+/−1 μm proves to be suitable. It is also advantageous to use an acrylonitrile butadiene styrene as molten plastic.

Provided the mold surface is suitably configured, the combination particularly of a titanium aluminium nitride coating and acrylonitrile butadiene styrene (ABS) can produce a matte surface impression. The plastic ABS is generally apt to form glossy spots and therefore requires subsequent painting. This tendency is partly attributable to the lower processing temperatures (T(ABS)=180-260° C., T(PP)=200-270° C.) compared to PP and the higher viscosity associated therewith.

In the chart shown in FIG. 6, the viscosity $\eta$ of ABS and of PP are plotted against the shear rate $\dot{\gamma}$ (x-axis) in the range from 103 to 104 [mm·s−1], which is the range relevant to injection molding. For these experiments, processing temperatures of 230° C. for PP and 250° C. for ABS ("easy-flowing") were used. Consequently, substantial secondary-finishing costs can be saved thanks to this invention. At the same time, it is possible to benefit from the other useful properties of the plastic ABS for injection-molded parts. It is of additional advantage to texture the mold surface, in particular such that it exhibits a degree of roughness which, when reproduced exactly by the solidified plastic, imparts the desired matte surface appearance to the injection-molded part. Typical Ra values for the surfaces of molds used in the production of car dashboard covers or in the field of architecture, or also in the production of plastic articles for everyday use, range from 3 to 11 μm. To measure the mean surface roughness Ra, the mean value of the "peaks" above and the "valleys" below a mean line is measured over a sampling length.

When molten ABS is used in combination with a titanium aluminium nitride coating with a thickness of 8 μm+/−1 μm, injection-molded parts can be obtained that have a matte effect and a surface finish largely comparable to those of polypropylene (PP). An adhesive layer can be provided between the mold surfaces of the injection-molding device and the coating. This adhesive layer can consist, for example, of titanium, TiAl, chromium, or titanium nitride. Reliable adhesion of the coatings, especially to steel surfaces, is thereby ensured.

The invention will now be described in detail on the basis of preferred embodiments and the enclosed drawings.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
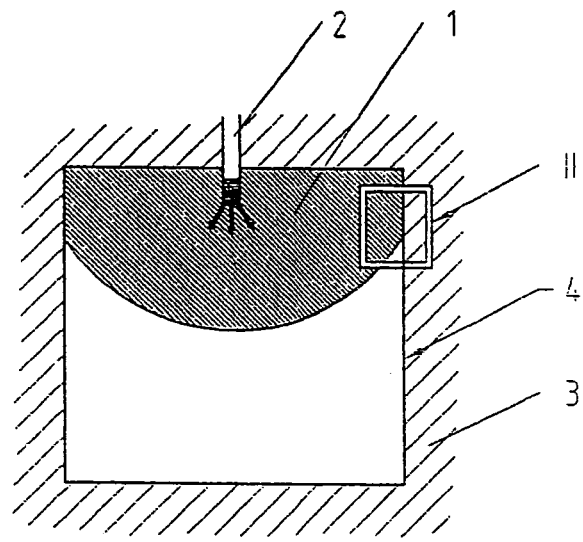
FIG. 1 diagrammatically depicts an embodiment of an injection-molding device at the moment when molten ABS is injected into the mold.

FIG. 1 depicts—very diagrammatically—a first embodiment of a device according to the invention for the injection molding of molten material, in this case of the plastic ABS 1. The molten plastic is introduced into the mold 3 via a feed port 2. The mold 3 has a mold surface 4 that is coated with a hard material.

Figure 2:
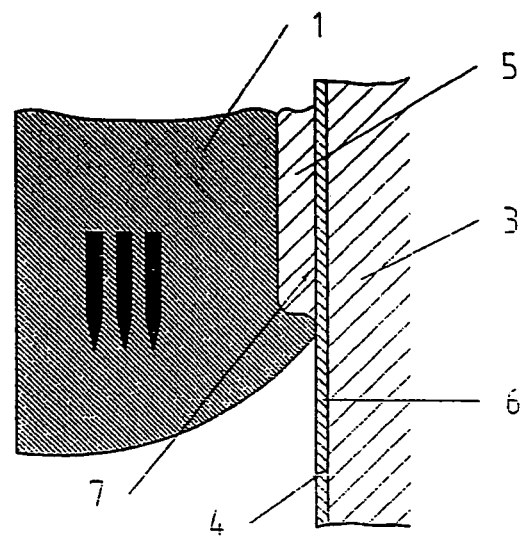
FIG. 2 is an enlarged view of the cut-out located in the region of the mold surface and identified as II in the device illustrated in FIG. 1.

FIG. 2 is an enlarged view of the cut-out denoted by II in FIG. 1; it shows the area in which the mold surface 4 is first wetted by the plastic 1. As this happens, a boundary layer 5 of the plastic 1 is formed and immediately solidifies. In this boundary layer, the temperature of the plastic falls below its melting point, so that the plastic converts to the solid state. The mold surface 4 is provided with a coating 6, in this embodiment a coating of titanium aluminium nitride. The arrows indicate the flow direction of the plastic 1 that is filling the mold. By appropriately selecting the thickness of the titanium aluminium nitride coating 6 it is possible—on account of the low heat penetration into the coating—to adjust the temperature variation through the titanium aluminium nitride coating 6 and the mold 3 during cooling of the plastic 1 such that at one contact surface 7 between the boundary layer 5 of the plastic 1 and the TiAlN coating 6, a contact temperature is obtained which is higher than the contact temperature at the mold surface 4 would be without the TiAlN coating. However, this contact temperature is lower than the melting temperature of the plastic 1. The outcome is that the plastic 1 has a longer time while solidifying to mold to the roughness of the contact surface 7 of the TiAlN coating 6, and hence to reproduce the roughness of the mold surface 4.

Figure 3:
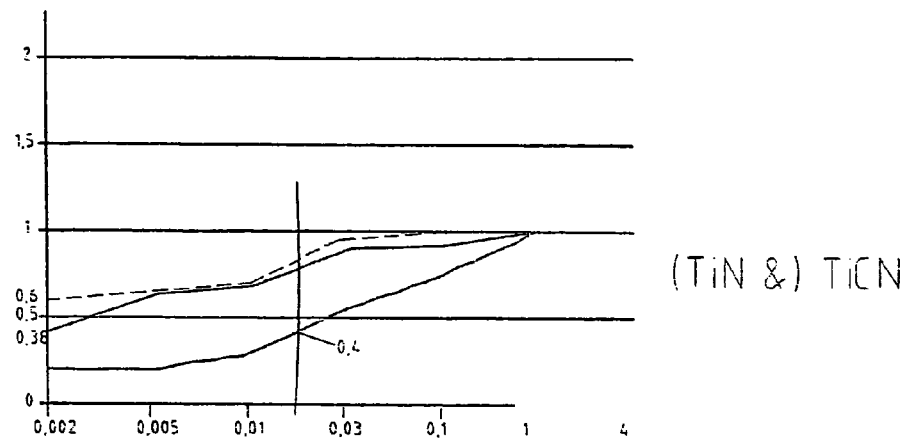
FIG. 3 is a chart in which the heat penetration coefficient of four coating materials is compared with that of steel.

FIG. 3 is a chart showing a comparison of the heat penetration coefficients of four different coating materials compared to steel. The continuous middle line represents the TiAlN coating. The heat penetration coefficient compared to the mold material, in this embodiment steel 1.2.343, is plotted as y-axis. The reciprocal square root of the heat-pulse frequency is plotted as x-axis. The dotted line represents a tungsten carbide/carbon coating, the continuous line, as already mentioned, the titanium aluminium nitride coating of this embodiment of the invention, and the dashed line a chromium nitride coating. It can be seen that with decreasing frequency, here higher x-axis values, the heat penetration coefficient approaches that of steel—i.e. the quotient of the coating material's heat penetration coefficient and the heat penetration coefficient of steel approaches 1. However, if the duration of the influence is very short, the insulating effect of the coating is very pronounced, since heat loss is hindered by the coated surface. The consequence of this is that during the initial brief contact when the boundary layer 5 in FIG. 1 is formed, a suitably adjusted coating thickness will effect a pronounced insulating effect by the titanium aluminium nitride layer 6, this insulating effect delaying solidification of the plastic 1 and enabling the boundary layer to mold to and hence reproduce the roughness of the mold surface 4. For the x-axis value of 0.002 or 250 kHz in the chart of FIG. 3, for example, values of 0.38 for TiAlN, 0.2 for WC/C and 0.6 for CrN can be read off as comparisons with the reference value 1 for steel.

TiN/TiCN 0.42; setting should be at least <0.6 preferably <0.45.

Figure 4:
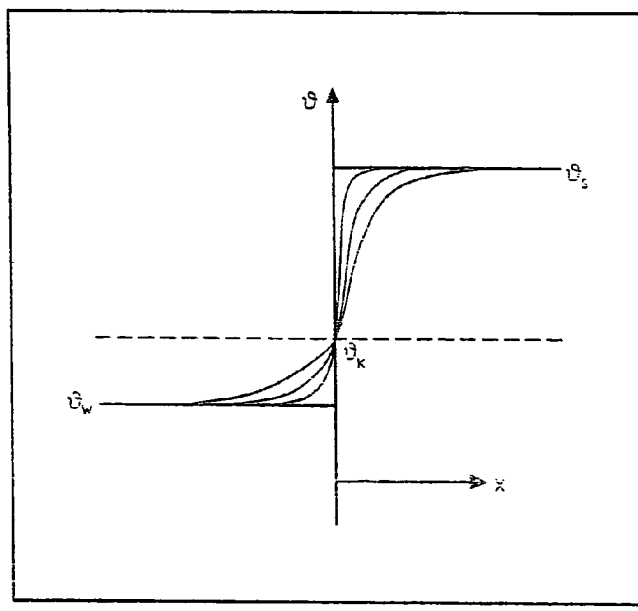
FIG. 4 is a chart showing the temperature variation at the interface between mold and plastic.

FIG. 4 is a basic diagram depicting the temperature variation and the determination of a contact temperature θK between a wall temperature θW and a molten-molding-compound temperature θS. The y-value indicates the temperature and the x-value the position of the measuring point in the wall or, in the positive direction, in the molten plastic. The tool-wall temperature changes relatively little when the molten plastic makes contact with it, since a large amount of heat is carried off by the cooling system. Temperature differences towards the edge are typically less than 15 K. The peripheral layer of molten plastic, however, is cooled spontaneously by more than 100 K. The all-important parameter, namely the contact temperature θK, determines the degree to which the roughness at the interface is reproduced. It can be influenced by the heat penetration coefficient e. This can be calculated for a material from the thermal conductivity ρ, the density λ and the specific heat capacity c of the material. The calculation is performed using the following equation:

$$e = \sqrt{\rho \cdot \lambda \cdot c}$$

From the heat penetration coefficients for the wall and the molten plastic and the temperatures for the wall and the molten plastic, a contact temperature θK can be calculated as follows:

$$\vartheta_K = \frac{e_W \cdot \vartheta_W + e_S \cdot \vartheta_S}{e_W + e_S}$$

In this equation, eW is the heat penetration depth of the wall material, θw the temperature of the wall material, eS the heat penetration depth of the molten plastic and θS the temperature of the molten plastic. By defining a suitable contact temperature θK, which, as described above, can be regulated by way of the coating thickness, solidification of the peripheral layer of plastic at the coating surface can be delayed, as a result of which the surface of the coatings or the mold surfaces are reproduced more accurately. The molten plastic has more time to mold to the fine surface details. The roughness number Ra of the coated mold surface and the roughness number Ra of the plastic surface being formed deviate only slightly from one another, and the desired properties, such as gloss level and color value, are imparted to the plastic.

However, since the coating is altogether relatively thin, the improved molding characteristics are obtained without noticeably increasing the time needed to produce the individual molded part. Due to the thinness of the coating, the heat flow is altogether only insignificantly hindered. Only at the first moment is it briefly delayed. The overall solidification time for the molded part is thus of the same order of magnitude as it is without the coating.

Figure 5:
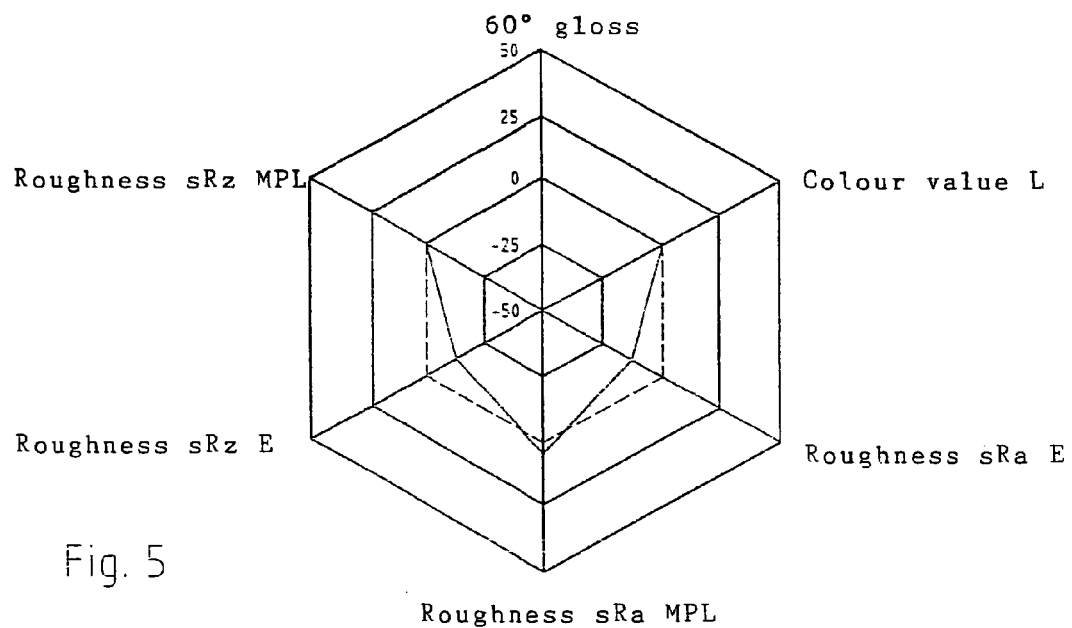
FIG. 5 is a chart comparing the surface-property-defining parameters of the plastics PP and ABS, based on two comparative specimens. The PP specimen was produced using an uncoated device, the ABS specimen using a coated device.
Figure 6:
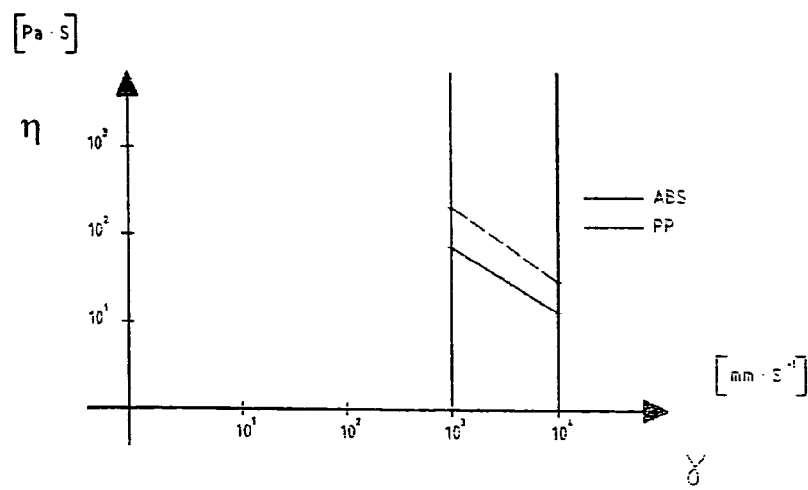
FIG. 6 is a chart in which the viscosities of ABS and of PP are plotted against the shear rate in the range relevant to injection molding.

FIG. 5 shows a comparison of the various parameters of the plastics polypropylene (PP) and acrylonitrile butadiene styrene (ABS), where the latter was injection-molded using a device according to the embodiment. The reference values for the injection-molded specimen (MPL) of polypropylene (PP) are joined by a dashed line, and the corresponding values for an MPL of ABS by a continuous line. The following properties, measured for the MPLs, are charted: the gloss level (60° measuring angle), the color value L determined via the bright/dark proportion, the roughness number Ra, which is defined by the arithmetic mean, and Rz, the arithmetic mean of a plurality of maximum peak-to-valley heights of individual sampling lengths. The roughnesses Ra and Rz of the mold E are also charted. For the comparison, the PP was injected into an uncoated mold and the ABS into a coated mold. Good roughness values Ra for giving a plastic a matte appearance range from 3 μm to 11 μm. A roughness value Ra of 3.3, in particular, has proved preferable for obtaining an ideal matte surface, for example of the kind desirable for dashboard covers. As the embodiments show, excellent values are also obtained in the range indicated—see the example where Ra=9 μm. The comparison shows that the agreement in gloss level and color value and in the roughness number Rz of the specimen made of the plastic ABS with that of the plastic PP is very good for a coating thickness between 7 and 12 μm, and optimal for a TiAlN coating thickness of 8 μm±1 μm. FIG. 5 shows the values for a coating thickness of approximately 8 μm. Except for a slight deviation of less than 5% in the roughness number Ra MPL, the parameters that determine the gloss level of the surface and the appearance of the ABS specimen are largely in agreement with those of the PP specimen.

Extensive test series were conducted for the embodiment described in this invention, in which the plastic ABS is injected-molded in a mold with a steel surface. For these tests, specimens of both the plastic ABS and PP were injection molded and compared with each other. The following parameters were measured: 60° gloss level, color value L*, mold-surface roughness Ra E, specimen-surface roughness Ra MPL, mold-surface roughness Rz E and specimen-surface roughness Rz MPL. The injection mold used was a steel mold with the steel designation Stippel 1 BB. The results are attached as an annex in four tables, in which Table 1 shows the values for the plastic ABS produced in a mold with a fine surface texture.

TABLE 1

ABS (Cyrolac 6320FB) Ra = 3.3 μm

| Data column | 1 | 2 | 3 | 4 | 5 | 6 |
|---|---|---|---|---|---|---|
| Coating | TiAlN | TiAlN | TiAlN | Uncoated | Uncoated | Uncoated |
| Coating thickness, applied or intended | 4 | 8 | 12 | 4 | 8 | 12 |
| 60° gloss level | 3.50 | 2.70 | 3.20 | 3.90 | 3.40 | 4.00 |
| Colour value L* | 24.88 | 25.43 | 25.57 | 25.35 | 25.73 | 26.06 |
| Roughness sRa E | 3.62 | 3.45 | 3.60 | 3.66 | 3.33 | 3.45 |
| Roughness sRa MPL | 3.39 | 3.40 | 3.48 | 3.17 | 3.54 | 3.29 |
| Delta b (sRa E, MPL) | −6.35% | −1.45% | −3.33% | −13.39% | 6.31% | −4.64% |
| Roughness sRz E | 28.26 | 26.93 | 28.64 | 30.27 | 30.35 | 28.41 |
| Roughness sRz MPL | 24.24 | 25.72 | 25.63 | 28.02 | 28.98 | 26.19 |
| Delta s (sRz E, MPL) | −14.23% | −4.49% | −10.51% | −7.43% | −4.51% | −7.81% |
| Delta vs. PP injected into uncoated | | | | | | |
| 60° gloss level | −29.63% | −8.00% | −18.52% | | | |
| Colour value L* | −0.04% | −3.21% | −2.61% | | | |

Table 2 shows the values for the plastic PP produced in a mold with a fine surface texture.

TABLE 2

PP (Hostacom P873F) Ra = 3.3 μm

| Data column | 1 | 2 | 3 | 4 | 5 | 6 |
|---|---|---|---|---|---|---|
| Coating | TiAlN | TiAlN | TiAlN | Uncoated | Uncoated | Uncoated |
| Coating thickness, applied or intended | 4 | 8 | 12 | 4 | 8 | 12 |
| 60° gloss level | 2.4 | 2.3 | 2.4 | 2.7 | 2.5 | 2.7 |
| Colour value L* | 24.74 | 24.86 | 25.07 | 24.87 | 24.64 | 24.92 |

TABLE 2-continued

| PP (Hostacom P873F) Ra = 3.3 μm | | | | | | |
|---|---|---|---|---|---|---|
| Data column | 1 | 2 | 3 | 4 | 5 | 6 |
| Roughness sRa E | 3.62 | 3.45 | 3.6 | 3.66 | 3.33 | 3.45 |
| Roughness sRa MPL | 3.37 | 3.31 | 3.55 | 3.18 | 3.59 | 3.32 |
| Delta b (sRa E, MPL) | −6.91% | −4.06% | −1.39% | −13.11% | 7.81% | −3.77% |
| Roughness sRz E | 28.26 | 26.93 | 28.64 | 30.27 | 30.35 | 28.41 |
| Roughness sRz MPL | 26.34 | 26.47 | 27.16 | 25.44 | 28.07 | 28.63 |
| Delta s (sRz E, MPL) | −6.79% | −1.71% | −5.17% | −15.96% | −7.51% | 0.77% |

Table 3 shows the values for the plastic ABS produced in a mold with a coarse surface texture.

TABLE 3

| ABS (Cyrolac 6320FB) Ra = 9 μm | | | | | | |
|---|---|---|---|---|---|---|
| Data column | 1 | 2 | 3 | 4 | 5 | 6 |
| Coating | TiAlN | TiAlN | TiAlN | Uncoated | Uncoated | Uncoated |
| Coating thickness, applied or | 4 | 8 | 12 | 4 | 8 | 12 |
| 60° gloss level | 1.7 | 1.7 | 1.7 | 2 | 2.2 | 1.9 |
| Colour value L* | 25.1 | 24.95 | 25.02 | 25.62 | 25.69 | 25.67 |
| Roughness sRa E | 10.82 | 8.79 | 10.99 | 9.82 | 9 | 10.21 |
| Roughness sRa MPL | 11.92 | 8.64 | 10.65 | 10.54 | 8.67 | 11.48 |
| Delta b (sRa E, MPL) | 10.17% | −1.71% | −3.09% | −7.33% | −3.67% | 12.44% |
| Roughness sRz E | 76.43 | 66.41 | 121.24 | 76.67 | 75.53 | 166.03 |
| Roughness sRz MPL | 94.67 | 68.6 | 77.57 | 73.69 | 71.38 | 189.05 |
| Delta s (sRz E, MPL) | 23.86% | 3.30% | −36.02% | −3.89% | −5.49% | −13.86% |
| Delta vs. PP injected into uncoated | | | | | | |
| 60° gloss level | −13.33% | −6.25% | −6.25% | | | |
| Colour value L* | −3.00% | −2.80% | −2.25% | | | |
| Delta s (sRz E, MPL) | 23.86% | 3.30% | −36.02% | −3.89% | −5.49% | −13.86% |
| Delta vs. PP injected into uncoated | | | | | | |
| 60° gloss level | −13.33% | −6.25% | −6.25% | | | |
| Colour value L* | −3.00% | −2.80% | −2.25% | | | |

Table 4 shows the values for the plastic PP produced in a mold with a coarse surface texture.

TABLE 4

| PP (Hostacom P873F) Ra = 9 μm | | | | | | |
|---|---|---|---|---|---|---|
| Data column | 1 | 2 | 3 | 4 | 5 | 6 |
| Coating | TiAlN | TiAlN | TiAlN | Uncoated | Uncoated | Uncoated |
| Coating thickness, applied or intended | 4 | 8 | 12 | 4 | 8 | 12 |
| 60° gloss level | 1.4 | 1.5 | 1.5 | 1.5 | 1.6 | 1.6 |
| Colour value L* | 24.35 | 24.39 | 24.40 | 24.37 | 24.27 | 24.47 |
| Roughness sRa E | 10.82 | 8.79 | 10.99 | 9.82 | 9 | 10.21 |
| Roughness sRa MPL | 17.92 | 8.74 | 10.56 | 10.54 | 8.79 | 11.29 |
| Delta b (sRa E, MPL) | −10.17 | −0.57% | −3.91% | 7.33% | −2.33% | 10.58% |
| Roughness sRz E | 76.43 | 66.41 | 121.24 | 76.67 | 75.53 | 166.03 |
| Roughness sRz MPL | 78 | 66.34 | 76.34 | 76.05 | 77.93 | 88.56 |
| Delta s (sRz E, MPL) | 2.05% | −0.11% | −37.03% | −0.81% | 3.18% | −46.66% |

Table 1 contains the values obtained for the plastic ABS produced in a mold with a fine surface texture (roughness Ra E of the mold surface=3.33 μm). In the columns 1 to 3 the values measured for the MPL produced using a TiAlN-coated mold are shown, along with the values for the mold itself, for coating thicknesses of 4 μm, 8 μm and 12 μm. The columns 4 to 6 contain the pertinent reference values for the MPL produced in the molds, and for the molds themselves, before the molds had been coated. Differences in the values contained in columns 4 to 6 are attributable to the scatter in values for the three molds used. For the most part, coating of the mold surfaces produces only a slight increase or decrease in roughness compared to the uncoated mold. For example, the Ra E value for the mold with an 8-μm coating is 3.45, compared with an Ra E value of 3.33 μm for the uncoated mold.

The surface-detail reproduction exhibited by the ABS specimen produced in the mold provided with an 8-μm coating having a roughness Ra E of 3.45 is very good: the surface of the ABS-MPL has a roughness Ra MPL of 3.40 μm. The error in surface-detail reproduction is only about 1.45%. The ABS-MPL has a 60° gloss level of 2.7, and a color value L* of 25.43.

For purposes of comparison, Table 2 contains the values for the plastic PP for a surface roughness Ra of 3.33 μm. The 5th column shows a gloss level of 2.5 and a color value L* of 24.64 for the PP-MPL. An ABS-MPL produced according to the invention and a PP-MPL produced—for purposes of comparison—in an uncoated mold thus show close agreement concerning the values that determine the optical properties. The optical properties of gloss level and color value for an ABS-MPL can be adjusted to those of a PP-MPL produced in an uncoated mold by selecting the roughness of the mold used for the ABS-MPL, the coating thickness and the coating material.

Especially with coatings that have a thickness of 8±1 μm, the roughness difference between the mold surface and the surface of the specimen produced in the mold is in a range less than or equal to 5%. With other coating thicknesses, it is usually possible to keep the difference less than or equal to 10%.

Table 3 contains the values obtained when an ABS-MPL is produced in a mold that has a coarse surface roughness of approximately 9 μm. The first three columns show the values—already explained above—for TiAlNi coating thicknesses of 4 μm, 8 μm and 12 □m. Columns 4 to 6 contain the pertinent reference values for the mold before application of the coating, i.e. for the still uncoated mold. From Table 3 it can be seen, for example, that the mold-surface roughness Ra E of 9 μm in the 5th column is altered only slightly to a value of 8.79 by application of an 8-μm coating of TiAlN, and that this roughness is reproduced very accurately by the ABS-MPL (Ra MPL=8.64 μm).

For purposes of comparison, Table 4 contains the same measured variables for the plastic PP, again for a coarse mold-surface roughness of 9 μm. A comparison of gloss levels for a coating thickness of 8 μm, for example, shows a value of 1.7 for ABS compared with a value of 1.6 for a PP MPL produced in an uncoated mold. The same comparison but for a coating thickness of 12 μm shows a value of 1.7 for ABS and 1.6 for PP.

The method of the invention permits more accurate reproduction of the roughness and fine surface detail of the mold surface, thus making it possible to replace certain molten molding materials with other ones without compromising the surface finish of the part produced. As a result, secondary treatment of surface defects is superfluous and the costs, for example for painting, can be saved. In addition, it is generally possible to reproduce also very finely textured surfaces that have special patterns or properties, for example, haptic properties. The method of the invention thus makes it possible to replace the relatively wear-prone plastic PP, to which the surface details of a mold are easily transferred, by the sturdy plastic ABS. Yet another advantage, which is already known from the prior art, is that the coating protects the surface of the injection-molding device and considerably increases the service life of the molding tools.

The above description is considered that of the preferred embodiment only. Modification of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. A method for injection molding molten materials in a mold that has a mold surface which comes into contact with the material comprising:
    providing the mold surface with a surface texture for obtaining a specified gloss level and/or color value for an injection-molded part by substantially exactly reproducing the mold surface on a part surface of the injection-molded part;
    providing the mold surface with at least one thermal insulating coating selected from the group consisting of titanium nitride (TiN), titanium carbon nitride (TiCN), chromium nitride (CrN), tungsten carbide/carbon (WC/C), titanium aluminium nitride (TiAlN), $Al_2O_3$, $(AlCr)_2O_3$ and $SiO_2$, wherein an adhesive layer is applied between the mold surface and the coating;
    controlling the temperature of the mold surface;
    introducing the molten material into the mold;
    cooling the mold surface by way of a temperature-control so that the molten material in the mold solidifies; and
    removing an injection-molded part from the mold; wherein the thickness of the coating for the mold surface is selected in coordination with a heat penetration coefficient of the material of the coating, so that premature freezing of the molten material before it has penetrated into the surface texture of the mold is delayed and, thus, the specified gloss level and/or color value for the injection-molded part is obtained.

2. The method for injection molding according to claim 1, wherein the adhesive layer is selected from the group consisting of titanium, chromium and TiN.

* * * * *

UNITED STATES PATENT AND TRADEMARK OFFICE
CERTIFICATE OF CORRECTION

PATENT NO.         : 8,512,621 B2
APPLICATION NO.    : 11/013164
DATED              : August 20, 2013
INVENTOR(S)        : Mumme It is certified that error appears in the above-identified patent and that said Letters Patent is hereby corrected as shown below:

<u>Title Page</u>
Item 73, "Assignee: OC Oerlikon Balzers AG, Furstentum (LI)" should be -- Assignee: Oerlikon Trading AG, Trubbach CH-9477 Trubbach, Switzerland --

Signed and Sealed this
Nineteenth Day of November, 2013

Teresa Stanek Rea
*Deputy Director of the United States Patent and Trademark Office*